United States Patent
Zou et al.

(10) Patent No.: US 11,874,582 B2
(45) Date of Patent: Jan. 16, 2024

(54) MONOLITHICALLY INTEGRATED OPTICAL ANALOG-TO-DIGITAL CONVERSION SYSTEM BASED ON LITHIUM NIOBATE-SILICON WAFER AND METHOD FOR MANUFACTURING THE SAME

(71) Applicant: Shanghai Jiao Tong University, Shanghai (CN)

(72) Inventors: Weiwen Zou, Shanghai (CN); Shaofu Xu, Shanghai (CN); Jing Wang, Shanghai (CN)

(73) Assignee: Shanghai Jiao Tong University, Shanghai (CN)

(*) Notice: Subject to any disclaimer, the term of this patent is extended or adjusted under 35 U.S.C. 154(b) by 424 days.

(21) Appl. No.: 17/170,883

(22) Filed: Feb. 8, 2021

(65) Prior Publication Data
US 2021/0255523 A1    Aug. 19, 2021

Related U.S. Application Data

(63) Continuation of application No. PCT/CN2020/078920, filed on Mar. 12, 2020.

(30) Foreign Application Priority Data

Feb. 19, 2020   (CN) .......................... 202010101410.0

(51) Int. Cl.
  *G02F 7/00* (2006.01)
  *G02F 1/03* (2006.01)
(52) U.S. Cl.
  CPC .............. *G02F 7/00* (2013.01); *G02F 1/0305* (2013.01); *G02F 1/0327* (2013.01); *G02F 2202/105* (2013.01); *G02F 2202/20* (2013.01)

(58) Field of Classification Search
  CPC ........ G02F 7/00; G02F 1/0305; G02F 1/0327; G02F 2202/105; G02F 2202/20
  See application file for complete search history.

(56) References Cited

U.S. PATENT DOCUMENTS

2005/0286602 A1   12/2005  Gunn et al.
2007/0081756 A1    4/2007  Terashima et al.
(Continued)

FOREIGN PATENT DOCUMENTS

| CN | 105607296 A | 5/2016 |
| CN | 106209252 A | 12/2016 |
| CN | 106990642 A | 7/2017 |

OTHER PUBLICATIONS

Gianlorenzo Masini et al,, "A germanium photoelectric detector array for the near infrared monolithically integrated with silicon CMOS readout electronics," Elsevier Physica E, vol. 16, No. 3, pp. 614-619 (2003).

*Primary Examiner* — Jennifer D Bennett
(74) *Attorney, Agent, or Firm* — Mei & Mark LLP; Manni Li

(57) ABSTRACT

A monolithically integrated optical analog-to-digital conversion system based on a lithium niobate-silicon wafer, and a method for manufacturing the same, wherein a novel wafer (lithium niobate-silicon wafer) is used to implement the monolithically integrated optical analog-to-digital conversion system having multiple photonic devices, including an electro-optical modulator array, a tunable delay line array, an electronic circuit, and the like. As a result, multiple devices are manufactured on one chip, and the performance advantages and the stability of the system are guaranteed. Moreover, the present invention provides a CMOS-compatible method for manufacturing the system, so that the monolithically integrated optical analog-to-digital conversion system (Continued)

based on the lithium niobate-silicon wafer can be implemented on platforms of most chip manufacturers.

3 Claims, 3 Drawing Sheets

(56) References Cited

U.S. PATENT DOCUMENTS

| | | |
|---|---|---|
| 2009/0103850 A1 | 4/2009 | Shastri et al. |
| 2010/0040322 A1 | 2/2010 | Li et al. |
| 2017/0302290 A1 | 10/2017 | Cai et al. |
| 2018/0267340 A1 | 9/2018 | Rohde |
| 2019/0302571 A1* | 10/2019 | Betts .................. H03M 1/1245 |
| 2019/0356394 A1 | 11/2019 | Bunandar et al. |
| 2019/0370652 A1* | 12/2019 | Shen .................. G06N 3/0675 |

* cited by examiner

MONOLITHICALLY INTEGRATED OPTICAL ANALOG-TO-DIGITAL CONVERSION SYSTEM BASED ON LITHIUM NIOBATE-SILICON WAFER AND METHOD FOR MANUFACTURING THE SAME

CROSS-REFERENCE TO RELATED APPLICATIONS

The subject application is a continuation of PCT/CN2020/078920 filed on Mar. 12, 2020, which claims priority on Chinese Application No. CN202010101410.0 filed on Feb. 19, 2020 in China. The contents and subject matter of the PCT international application and Chinese priority application are incorporated herein by reference.

TECHNICAL FIELD

The present invention relates to optoelectronic integration, and particularly, a monolithically integrated optical analog-to-digital conversion system based on a lithium niobate-silicon wafer and method for manufacturing the same.

BACKGROUND ART

Analog-to-digital converters, which are necessary to convert real analog signals into digital signals that can be processed by a computer, are widely used in electronic information systems. An optical analog-to-digital converter is an analog-to-digital conversion technique based on the advantage of photon high-speed broadband, which can effectively increase the receiving bandwidth of the analog-to-digital converter. Although extensive research has been made into the performance indexes of the optical analog-to-digital converter, such as effective bits and receiving bandwidth, it is still challenging to realize an optical analog-to-digital conversion system because a large number of photoelectric cell devices and tunable devices are required in the optical analog-to-digital conversion system. The optical analog-to-digital conversion system prototypes in the current technology have the problems of bulky size, high power consumption, difficult control, etc. The optoelectronic integration technique provides an effective solution to these problems by integrating a large number of optoelectronic devices on a chip, whereby the power consumption and size of the optical analog-to-digital conversion system are greatly reduced, and easier control is realized due to the high stability of the chip.

Nevertheless, it is difficult for most of the optoelectronic integration techniques in the current technology to integrate multiple devices on a single chip, as low-loss transmission of optoelectronic signals between chips becomes the prominent bottleneck issue. The overall performance of the system cannot be improved without effectively interconnecting a single cell device with other cell devices, even if the single cell device reaches a high level of performance. Therefore, monolithic system integration has become the future trend of optoelectronic systems, including optical analog-to-digital conversion systems. An optoelectronic monolithically integrated communication transceiver system has been provided in the current technology, the performance such as extinction ratio and speed of a modulator implemented through a silicon-based compensated metal oxide semiconductor (CMOS) process can only satisfy the transmission of communication digital signals but is unable to work in analog-to-digital conversion. Therefore, it is desirable to have a novel monolithic system integration technique to implement optoelectronic devices, including high-performance electro-optical modulators, to produce a monolithic optical analog-to-digital conversion system.

SUMMARY OF INVENTION

The present invention overcomes the defects in the current technology by providing a monolithically integrated optical analog-to-digital conversion system based on a lithium niobate-silicon wafer and a method for manufacturing the same. The present invention employs a novel lithium niobate-silicon wafer to realize a monolithically integrated optical analog-to-digital conversion system including an electro-optical modulator array, a photon passive device array, a photoelectric detector array, an electronic circuit, and an electronic drive circuit. The monolithically integrated system comprise all the photoelectric cell components required by the optical analog-to-digital converter except a light source so that photoelectric coupling among multiple chips can be avoided and the whole process of analog signal input and digital signal output is completed in a single chip. Moreover, the monolithically integrated optical analog-to-digital conversion system of the present invention is compatible with the silicon-based complementary metal oxide semiconductor (CMOS) process and can thus be implemented on platforms of most chip manufacturers, as a result, the difficulty and the cost for implementing the system are reduced.

The present invention provides a monolithically integrated optical analog-to-digital conversion system based on a lithium niobate-silicon wafer, comprising an electro-optical modulator array (100), a tunable delay line array (200), a photoelectric detector array (300), a radio-frequency drive circuit (400), a direct-current drive circuit (500), and an electronic signal processing circuit (600), all integrated on a single chip; the electro-optical modulator array (100) receives optical pulses and analog signals input from the outside, and completes sampling of the analog signals and time-division demultiplexing of the optical pulses to form 2n paths of optical outputs under the drive of the radio-frequency drive circuit (400) and the direct-current drive circuit (500); the electro-optical modulator array (100) comprises 2n lithium niobate-silicon electro-optical modulators, one of which serves as a sampling gate (101) and receives an analog signal input; the sampling gate is a single-output electro-optical modulator with only one optical output port, and the other 2n−1 electro-optical modulators form an n-level time-division demultiplexing structure (102), and each electro-optical modulator is a double-output electro-optical modulator with two optical output ports, and $2^n-1$ electro-optical modulators of the n-th level have 2n optical output ports; the tunable delay line array (200) comprises 2n tunable delay lines positioned behind the 2n optical output ports of the electro-optical modulator array (100), respectively; the photoelectric detector array (300) comprises 2n silicon-germanium photoelectric detectors positioned behind the 2n optical output ports of the tunable delay line array (200), respectively; the radio-frequency drive circuit (400) comprises a clock (401), a frequency multiplier group (402), a frequency divider group (403), a filter group (404), and a phase shifter group (405) for providing time-division demultiplexing structure of the electro-optical modulator array (100) with radio-frequency drive signals and the electronic signal processing circuit (600) with clock signals; the direct-current drive circuit (500) comprises a tunable voltage source group (501) and a direct-current power source group (502) for controlling a bias voltage of each electro-optical modulator in the electro-optical modulator array (100) to provide the tunable delay line of the tunable delay line array (200) with direct-current signals and to provide each photoelectric detector of the photoelectric detector array (300) with a power source; the electronic signal processing circuit (600) comprises a trans-impedance amplifier group (601), an electronic analog-to-digital converter group (602), and a digital signal processor (603), sequentially, the trans-impedance amplifier group (601) converts current signals output by the photoelectric detector array (300) into voltage signals, amplifies the voltage signals and inputs to the electronic analog-to-digital converter group (602), the electronic analog-to-digital converter group (602) quantizes the voltage signals and then outputs digital signals for the digital signal processor (603), and the digital signal processor (603) outputs the digital signals as the output of the whole system after completing channel interleaving processing.

In the present invention, the connections are as follows. The optical pulses input from outside are connected to an optical input port of the sampling gate (101); the analog signals are input through an electrical input port of the sampling gate (101); the optical output port of the sampling gate (101) is connected to the optical input port of a first-level double-output modulator of the time-division demultiplexing structure (102); $2^n-1$ radio-frequency output ports of the radio-frequency drive circuit (400) are correspondingly connected to electrical input ports of the 2n−1 double-output modulators in the time-division demultiplexing structure (102); the 2n optical output ports of the n-th level of the time-division demultiplexing structure are correspondingly connected to the optical input ports of the 2n tunable delay lines (200); the 2n optical output ports of the tunable delay line array (200) are correspondingly connected to the 2n optical input ports of the photoelectric detector array (300); the 2n electrical output ports of the photoelectric detector array (300) are correspondingly connected to 2n electrical signal input ports of the electronic signal processing circuit (600); a clock signal output end of the radio-frequency drive circuit (400) is connected to a clock input port of the electronic signal processing circuit (600); voltage outputs of the direct-current drive circuit (500) are connected to the sampling gate (101), the double-output modulator of the time-division demultiplexing structure (102), the tunable delay line (200), and a direct-current input port of the photoelectric detector array (300), respectively; and the electrical output port of the electronic signal processing circuit (600) is an output port of the system, and n≥2.

The present invention further provides a method for manufacturing the monolithically integrated optical analog-to-digital conversion system as described, comprising:

(1) preparation of waveguide structures of photonic devices: composing the lithium niobate-silicon wafer of a substrate layer (740), a silicon dioxide layer (730), a lithium niobate layer (720), and a silicon layer (710) from bottom to top; providing the waveguide structures (711) of the photonic devices on the silicon layer (710), the uppermost of the lithium niobate-silicon wafer, the structures (711) comprising an optical splitter, a beam combiner, a phase shift straight waveguide, and optical input/output ports of the electro-optical modulator array (100), delay waveguides, a thermo-optical switch, and optical input/output ports of the tunable delay line array (200), and optical input ports of the photoelectric detector array (300), and determining process parameters of exposure time according to respective widths and heights of corresponding different waveguides; and connecting the waveguides according to the connections as described in claim 1, manufacturing a mask plate according to the waveguide connections, and etching the silicon layer through a standard CMOS process to form waveguide structures (711) of all photonic devices;

(2) preparation of a germanium film active area of the photoelectric detector array: depositing a germanium film on the top of the lithium niobate-silicon wafer through a chemical vapor deposition method on the basis of step (1), etching the germanium film through a CMOS process, reserving one piece of germanium film behind the optical input port of each photoelectric detector as an active area (712), and removing the rest of the germanium film, each germanium film active area (712) covering a section of an optical waveguide, so that light entering through the optical input port is converted into electric signals when reaching the active area (712);

(3) formation of an electronic circuit: protecting the photonic device array formed in steps (1) and (2) with photoresist or a deposited protective material (713), and forming electronic devices (714) required in the system through a standard CMOS process, electronic devices (714) comprising a clock (401), a frequency multiplier group (402), a frequency divider group (403), a filter group (404), a phase shifter group (405), and an amplifier group (406) in the radio-frequency drive circuit (400), the direct-current drive circuit (500), and the electronic signal processing circuit (600); and (4) preparation of all electrodes (715) and electrical interconnection lines (717): forming all electrodes of the electro-optical modulator array (100), all electrodes of the tunable delay line array (200), and all electrodes of the photoelectric detector array (300); forming the electrical interconnection line between the photoelectric detector electrodes and the electronic signal processing circuit (600), forming the electrical interconnection line between the radio-frequency drive circuit (400) and the electro-optical modulator array (100), forming the electrical interconnection lines of the direct-current drive array (500) with the electro-optical modulator array (100), the tunable delay line array (200), and the photoelectric detector array (300), forming the electrical interconnection line for the sampling gate (101) to receive the input from the outside, and forming the electrical interconnection line for the electronic signal processing circuit (600) to output to the outside; etching to remove the protective layer first and depositing an electrode material in the plane of the optical waveguide in the case of the photonic device array with the protective layer; etching to form through-holes (716) first and depositing an electrode material to a position communicated with the electronic devices in the case of the electronic devices with the protective layer; and completing the preparation of all the electric interconnection lines (717). In the present invention, the material of the substrate is lithium niobate, silicon, or silicon nitride.

The details of time-division demultiplexing is described in Chinese Patent Application Publication CN106990642A to ZOU, Weiwen et al., which is incorporated herein by reference.

In the present invention, all the electro-optical modulators are lithium niobate-silicon electro-optical modulators, and the only portion that needs to be etched is that of silicon. The tunable delay line can achieve different optical delays according to signals loaded by a direct-current drive circuit, so that the problem of delay mismatch caused by time-division demultiplexing is solved.

In the present invention, the radio-frequency drive circuit comprises a clock, a frequency multiplier group, a frequency divider group, a filter group, a phase shifter group, and an amplifier group, intended to provide a time-division demultiplexing structure in the electro-optical modulator array with the radio-frequency drive signal described in CN106990642A to ZOU, Weiwen et al., and to provide an electronic signal processing circuit with clock signals.

In the present invention, each germanium film active area covers a section of an optical waveguide, so that light entering through the optical input port is converted into electric signals when reaching the active area. The preparation method thereof can be found in Gianlorenzo Masini, et al, *A germanium photoelectric detector array for the near infrared monolithically integrated with silicon CMOS readout electronics*, Elsevier Physica E, vol. 16, no. 3, pp. 614-619 (2003), which is incorporated herein by reference.

The present invention is advantageous in that:

The present invention is the first to propose implementing a monolithically integrated optical analog-to-digital conversion system with a novel wafer (lithium niobate-silicon wafer), while the conventional integration technique can only integrate the high-speed electro-optical modulator, the tunable delay line, the photoelectric detector, the electronic drive circuit, and the electronic signal processing circuit in chips, and then implement a multi-chip module through the optical and electrical coupling among the chips. Such a conventional process requires high costs on the preparation of the chips and research and development, the coupling among the chips requires high precision but features high loss, and optical analog-to-digital conversion system produced thereby is poor in performance, as a result, the conventional process greatly limits the integrated optical analog-to-digital conversion system in production and use. However, the present invention sets forth that monolithic integration of the high-speed electro-optical modulator, the tunable delay line, the photoelectric detector, the electronic drive circuit, and the electronic signal processing circuit can be completed simultaneously on the basis of the lithium niobate-silicon wafer. All the devices required for the optical analog-to-digital conversion system can be formed in one step without signal-coupling among the chips, thereby greatly reducing the cost of the preparation of the chips and research and development while improving the performance of the optical analog-to-digital conversion system. Accordingly, the present invention also provides a detailed description of the steps for manufacturing the optical analog-to-digital conversion system based on the lithium niobate-silicon wafer. The monolithically integrated optical analog-to-digital conversion system based on the lithium niobate-silicon wafer can be implemented on an existing standard CMOS process platform by following the steps, with the cost of the preparation of the chip further reduced.

BRIEF DESCRIPTION OF THE DRAWINGS

FIGS. 6A to 6E show steps for manufacturing the monolithically integrated optical analog-to-digital conversion system of the present invention, wherein FIG. 6A shows an original lithium niobate-silicon wafer, FIG. 6B shows cross-sectional view of a wafer after the preparation of a photonic device waveguide structure is completed, FIG. 6C shows cross-sectional view of the wafer after the preparation of a germanium film active area of a photoelectric detection array is completed, FIG. 6D shows cross-sectional view of the wafer after the formation of the electronic circuit is completed, and FIG. 6E shows cross-sectional view of the wafer after the formation of an electrode and an electrical interconnection line is completed.

DETAILED DESCRIPTION OF INVENTION

Figure 1:
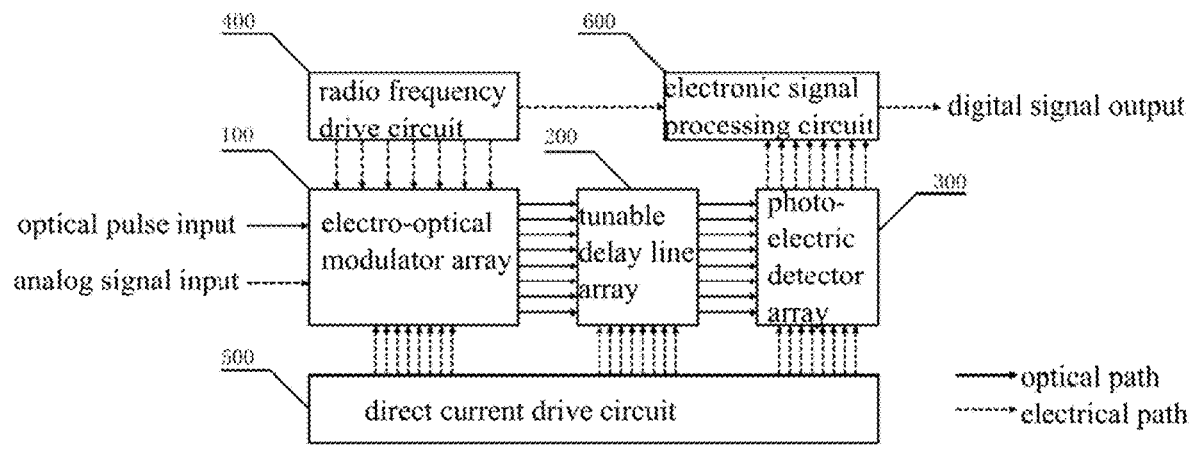
FIG. 1 shows the composition of the monolithically integrated optical analog-to-digital conversion system, the relationship between signal input and output, and connections among components in one embodiment of the monolithically integrated optical analog-to-digital conversion system based on a lithium niobate-silicon wafer of the present invention.
Figure 2:
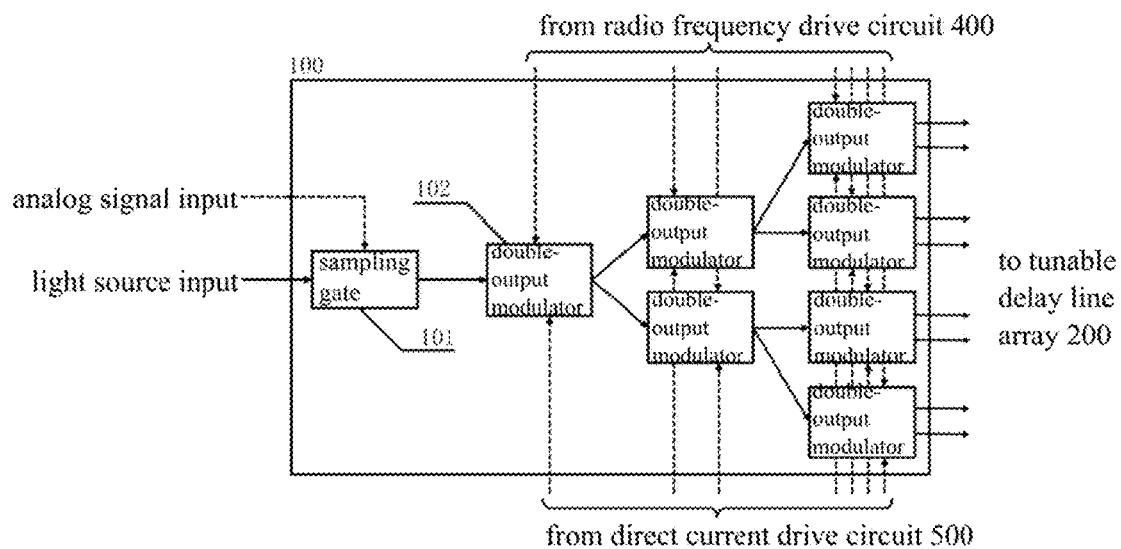
FIG. 2 shows the composition and connections among components of an electro-optical modulator array in one embodiment of the present invention.
Figure 3:
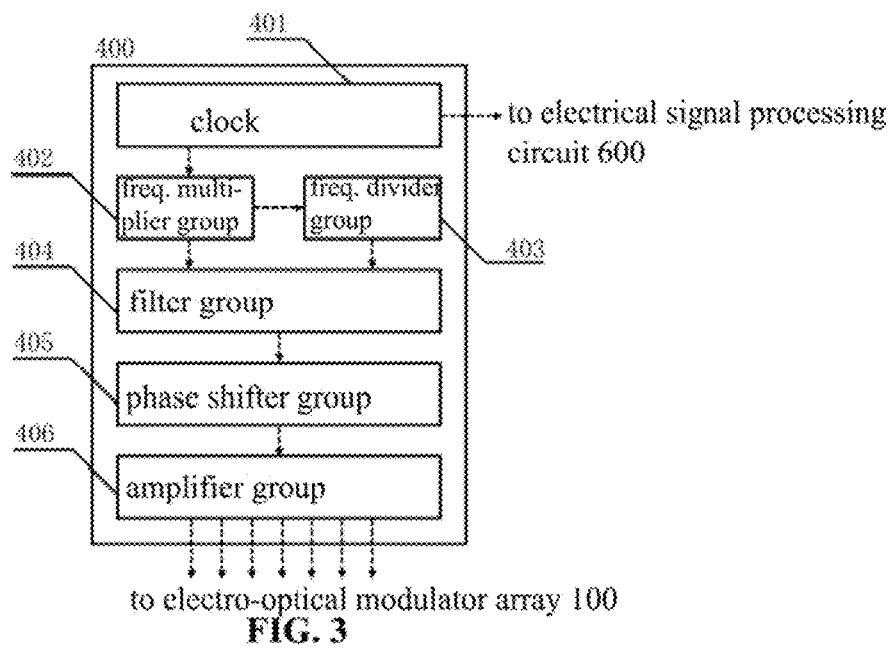
FIG. 3 shows the composition and connections among components of a radio-frequency drive circuit in one embodiment of the present invention.
Figure 4:
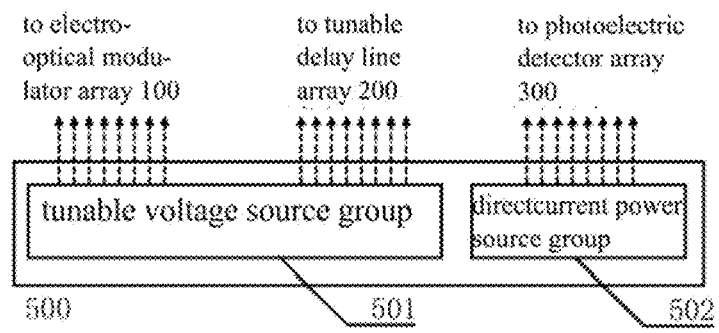
FIG. 4 shows the composition and connections among components of a direct-current drive circuit in one embodiment of the present invention.
Figure 5:
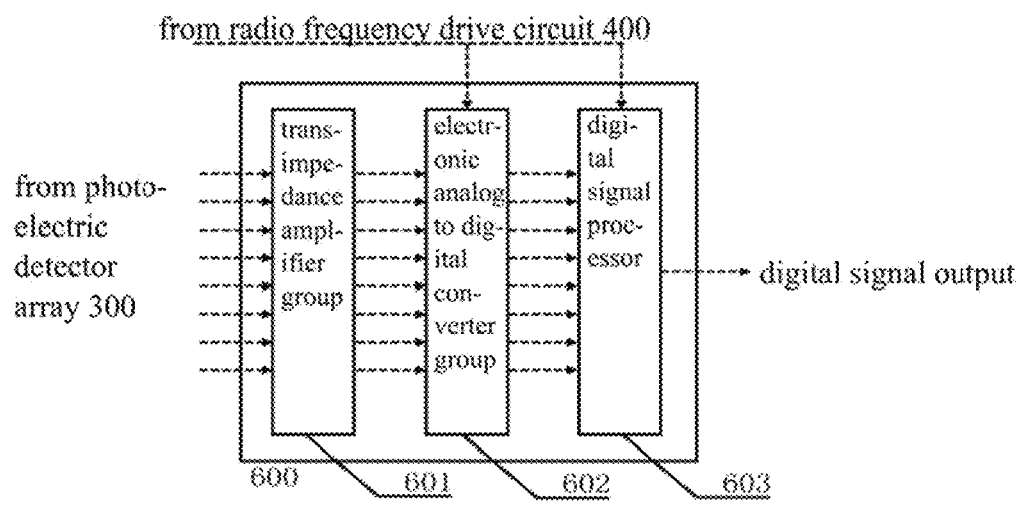
FIG. 5 shows the composition and connections among components of an electronic signal processing circuit in one embodiment of the present invention.

The present invention is described in detail with reference to the drawings and embodiments with details of implementations and structures given, but the scope of the present invention is not limited to the following embodiments.

With reference to FIGS. 1 to 5, which include a general architectural diagram of an embodiment of a monolithically integrated optical analog-to-digital conversion system based on a lithium niobate-silicon wafer according to the present invention and illustrate the composition of the monolithically integrated optical analog-to-digital conversion system, the relationship between signal input and output, and connections among components thereof, the monolithically integrated optical analog-to-digital conversion system based on the lithium niobate-silicon wafer, as shown, comprises an electro-optical modulator array 100, a tunable delay line array 200, a photoelectric detector array 300, a radio-frequency drive circuit 400, a direct-current drive circuit 500, and an electronic signal processing circuit 600. The electro-optical modulator array 100 receives optical pulses and analog signals input from the outside and completes sampling of the analog signals and time-division demultiplexing of the optical pulses to form 2n paths of optical outputs under the drive of the radio-frequency drive circuit 400 and the direct-current drive circuit 500; herein, n=3. The electro-optical modulator array 100 includes 2n lithium niobate-silicon electro-optical modulators, one of which serves as a sampling gate 101 and receives an analog signal input. The sampling gate is a single-output electro-optical modulator, i.e., with only one optical output port, while the other (2n−1) electro-optical modulators form an n-level time-division demultiplexing structure 102, each electro-optical modulator of which is a double-output electro-optical modulator, i.e., with two optical output ports. The details of time-division demultiplexing are described in CN106990642A, which is incorporated herein by reference. All of the electro-optical modulators described above are lithium niobate-silicon electro-optical modulators, and the only portion that needs to be etched is that of silicon. The tunable delay line array 200 has 2n tunable delay lines positioned behind the optical output ports of the electro-optical modulator array 100, respectively. The tunable delay line can achieve different optical delays according to signals loaded by the direct-current drive circuit 500 so that the problem of delay mismatch caused by time-division demultiplexing is solved. The photoelectric detector array 300 includes 2n silicon-germanium photoelectric detectors positioned behind the optical output ports of the tunable delay line array 200, respectively, to convert optical signals into electric signals. The radio-frequency drive circuit 400 consists of a clock 401, a frequency multiplier group 402, a frequency divider group 403, a filter group 404, and a phase shifter group 405, intended to provide the time-division demultiplexing structure of the electro-optical modulator array 100 with radio-frequency drive signals described in CN106990642A, and to provide the electronic signal processing circuit 600 with clock signals. The direct-current drive circuit 500 includes a tunable voltage source group 501 and a direct-current power source group 502, intended to control a bias voltage of each electro-optical modulator in the electro-optical modulator array 100, to provide the tunable delay line of the tunable delay line array 200 with direct-current signals, and to provide each photoelectric detector of the photoelectric detector array 300 with a power source. The electronic signal processing circuit 600 includes a trans-impedance amplifier group 601, an electronic analog-to-digital converter group 602, and a digital signal processor 603. The trans-impedance amplifier group 601 converts current signals output by the photoelectric detector array 300 into voltage signals and amplifies the voltage signals. The electronic analog-to-digital converter group 602 quantizes the voltage signals and then outputs digital signals. The digital signal processor 603, after completing channel interleaving processing, outputs the digital signals output by the electronic analog-to-digital converter as the output of the whole system finally.

With reference to FIGS. 6A to 6E, an embodiment of the steps for manufacturing the monolithically integrated optical analog-to-digital conversion system is provided as follows.

(1) Preparation of Waveguide Structures of Photonic Devices

Figure 6A:
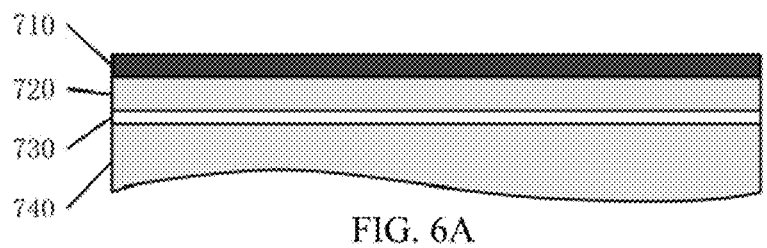
Figure 6B:
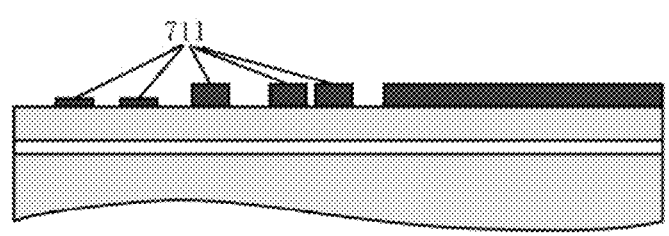

The layered structure of the lithium niobate-silicon wafer herein, as shown in FIG. 6A, includes a lithium niobate (or silicon, silicon nitride and the like that can be used as substrate materials) layer 740, a silicon dioxide layer 730, a lithium niobate layer 720 and a silicon layer 710 from bottom to top. The silicon layer 710 is etched through a standard CMOS process to provide waveguide structures 711 required by all the photonic devices, as shown in FIG. 6B. The waveguide structures 711 of the photonic devices include an optical splitter, a beam combiner, a phase shift straight waveguide, and optical input/output ports of the electro-optical modulator array 100, delay waveguides, a thermo-optical switch, and optical input/output ports of the tunable delay line array 200, and optical input ports of the photoelectric detector array 300. The waveguides are connected as described in FIG. 1 and CN106990642A. Process parameters such as exposure time are determined according to widths and heights respectively designed for corresponding different waveguides. A mask plate is manufactured according to the waveguide connections, and the silicon layer is etched through the standard CMOS process to form waveguide structures 711 of all the photonic devices.

Figure 6C:
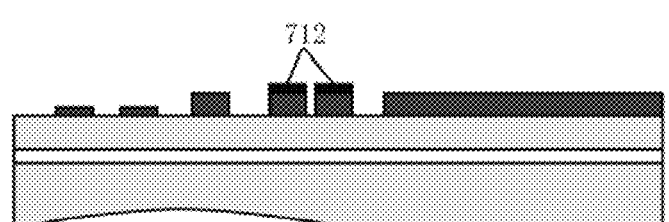

(2) Preparation of a Germanium Film Active Area of the Photoelectric Detector Array With reference to FIG. 6C, a germanium film is deposited on the top of the wafer through a chemical vapor deposition method on the basis of the optical input port of the photoelectric detector obtained in the previous step. The germanium film is then etched through a CMOS process, with one piece of germanium film behind the optical input port of each photoelectric detector reserved as an active area 712 and the rest of the germanium film removed. Each germanium film active area 712 covers a section of an optical waveguide, so that light entering through the optical input port is converted into electric signals when reaching the active area 712. The preparation method thereof can be found in Gianlorenzo Masini, et al, A germanium photoelectric detector array for the near infrared monolithically integrated with silicon CMOS readout electronics, Elsevier Physica E, vol. 16, no. 3, pp. 614-619 (2003).

(3) Formation of an Electronic Circuit

Figure 6D:
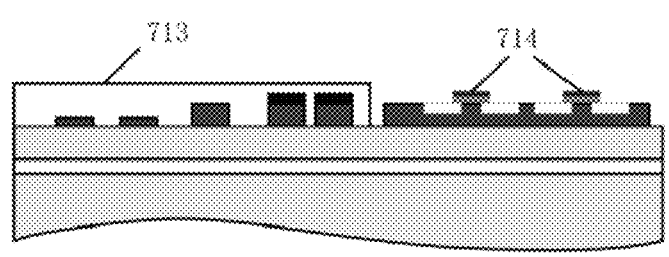
Figure 6E:
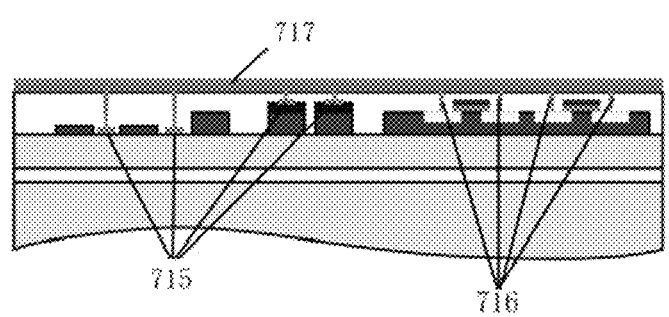

With reference to FIG. 6D, the photonic device array formed in steps (1) and (2) is protected with photoresist or a deposited protective material 713 at the beginning of this step. Electronic devices 714 required in the system, such as transistors, resistors, capacitors, inductors, are then formed, and include a clock 401, a frequency multiplier group 402, a frequency divider group 403, a filter group 404, a phase shifter group 405, and an amplifier group 406 in the radio-frequency drive circuit 400, the direct-current drive circuit 500, and the electronic signal processing circuit 600. The highest voltage required by the system is limited to 3.3V. All the above electronic devices 713 can be manufactured under the conditions of the standard CMOS process.

(4) Preparation of all Electrodes (715) and Electrical Interconnection Lines (717)

Structures to be formed in this step include all electrodes of the electro-optical modulator array 100, all electrodes of the tunable delay line array 200, and all electrodes of the photoelectric detector array 300. These electrodes are designated as 715 in FIG. 6E. Structures to be further formed in this step include the electrical interconnection line between the photoelectric detector electrodes and the electronic signal processing circuit, the electrical interconnection line between the radio-frequency drive circuit and the electro-optical modulator array, the electrical interconnection lines of the direct-current drive array with the electro-optical modulator array, the tunable delay line array, and the photoelectric detector array, the electrical interconnection line for the sampling gate to receive the input from the outside, and the electrical interconnection line for the electronic signal processing circuit to output to the outside. The electrical interconnection line is designated as 717 in FIG. 6E. The photonic device array with the protective layer is etched to remove the protective layer first, and electrode material is deposited in the plane of the optical waveguide. The electronic devices with the protective layer are etched to form through-holes 716 first, and electrode material is deposited to a position communicated with the electronic devices. Finally, the preparation of all the electric interconnection lines 717 is completed. The above steps can all be implemented in the standard CMOS process.

We claim:

1. A monolithically integrated optical analog-to-digital conversion system based on a lithium niobate-silicon wafer, comprising
    an electro-optical modulator array (100),
    a tunable delay line array (200),
    a photoelectric detector array (300), a radio-frequency drive circuit (400),
a direct-current drive circuit (500), and
an electronic signal processing circuit (600),
wherein the electro-optical modulator array (100), the tunable delay line array (200), the photoelectric detector array (300), the radio-frequency drive circuit (400), the direct-current drive circuit (500), and the electronic signal processing circuit (600) are integrated on a single chip;
the electro-optical modulator array (100) receives an optical pulse and analog signal input from an outside out of the monolithically integrated optical analog-to-digital conversion system, and completes sampling of the analog signal and time-division demultiplexing of the optical pulse to form $2^n$ paths of optical outputs under the drive of the radio-frequency drive circuit (400) and the direct-current drive circuit (500);
the electro-optical modulator array (100) comprises $2^n$ lithium niobate-silicon electro-optical modulators, one of which is a sampling gate (101) for receiving the analog signal input;
the sampling gate (101) is a single-output electro-optical modulator with only one optical output port, and the other $2^n-1$ electro-optical modulators form an n-level time-division demultiplexing structure (102), and each of the other 2n−1 electro-optical modulators is a double-output electro-optical modulator with one optical input port and two optical output ports, and n-th level electro-optical modulators of the n-level time-division demultiplexing structure have $2^n$ optical output ports;
the tunable delay line array (200) comprises $2^n$ tunable delay lines positioned behind the $2^n$ optical output ports of the electro-optical modulator array (100), respectively; each of the $2^n$ tunable delay lines comprises an optical input port and an optical output port; and each of the $2^n$ optical output ports of the n-th level electro-optical modulators of the n-level time-division demultiplexing structure (102) is connected to a corresponding optical input port of the $2^n$ tunable delay lines;
the photoelectric detector array (300) comprises $2^n$ silicon-germanium photoelectric detectors positioned behind the $2^n$ optical output ports of the $2^n$ tunable delay lines, respectively; each of the $2^n$ silicon-germanium photoelectric detectors comprises an optical input port and an electrical signal output port; and each of the optical output ports of the $2^n$ tunable delay lines is connected to a corresponding optical input port of the $2^n$ silicon-germanium photoelectric detectors;
the radio-frequency drive circuit (400) comprises a clock (401), a frequency multiplier group (402), a frequency divider group (403), a filter group (404), and a phase shifter group (405) for providing the time-division demultiplexing structure of the electro-optical modulator array (100) with radio-frequency drive and the electronic signal processing circuit (600) with clock signals;
the direct-current drive circuit (500) comprises a tunable voltage source group (501) and a direct-current power source group (502) for controlling a bias voltage of each electro-optical modulator in the electro-optical modulator array (100) to provide the tunable delay line of the tunable delay line array (200) with direct-current and to provide each photoelectric detector of the photoelectric detector array (300) with a power source;
the electronic signal processing circuit (600) comprises a trans-impedance amplifier group (601), an electronic analog-to-digital converter group (602), and a digital signal processor (603), sequentially, the trans-impedance amplifier group (601) converts current signals output by the photoelectric detector array (300) into voltage signals, amplifies the voltage and inputs to the electronic analog-to-digital converter group (602), the electronic analog-to-digital converter group (602) quantizes the voltage and then outputs digital signals for the digital signal processor (603), and the digital signal processor (603) outputs the digital signals as an output of the monolithically integrated optical analog-to-digital conversion system after completing channel interleaving processing;
wherein the optical pulse input is connected to an optical input port of the sampling gate (101);
the analog signal is input through an electrical input port of the sampling gate (101);
the only one optical output port of the sampling gate (101) is connected to an optical input port of a first-level electro-optical modulator of the $2^n-1$ electro-optical modulators of the n-level time-division demultiplexing structure (102);
$2^n-1$ radio-frequency output ports of the radio-frequency drive circuit (400) are correspondingly connected to electrical input ports of the $2^n-1$ electro-optical modulators of the n-level time-division demultiplexing structure (102);
the $2^n$ electrical signal output ports of the photoelectric detector array (300) are correspondingly connected to $2^n$ electrical signal input ports of the electronic signal processing circuit (600);
a clock signal output end of the radio-frequency drive circuit (400) is connected to a clock input port of the electronic signal processing circuit (600);
voltage outputs of the direct-current drive circuit (500) are connected to the sampling gate (101), the $2^n-1$ electro-optical modulators of the n-level time-division demultiplexing structure (102), the tunable delay line array (200), and a direct-current input port of the photoelectric detector array (300), respectively; and
an electrical output port of the electronic signal processing circuit (600) is an output port of the system, and n≥2.

2. A method for manufacturing the monolithically integrated optical analog-to-digital conversion system as described in claim 1, comprising:
(1) preparation of waveguide structures (711):
composing the lithium niobate-silicon wafer of a substrate layer (740), a silicon dioxide layer (730), a lithium niobate layer (720), and a silicon layer (710) from bottom to top;
providing the waveguide structures (711) on the silicon layer (710), the uppermost of the lithium niobate-silicon wafer, the waveguide structures (711) comprising an optical splitter, a beam combiner, a phase shift straight waveguide, and the optical input and output ports of the electro-optical modulator array (100), delay waveguides, a thermo-optical switch, and the optical input and output ports of the tunable delay line array (200), and the optical input ports of the photoelectric detector array (300), and determining process parameters of exposure time according to respective widths and heights of corresponding different waveguides; and
connecting the waveguides according to the connections between the optical output ports of the electro-optical modulator array (100) and the optical input ports of the tunable delay line array (200) and between the optical output ports of the tunable delay line array (200) and the optical input ports of the photoelectric detector array (300) as described in claim 1, manufacturing a mask plate according to the connections, and etching the silicon layer through a standard CMOS process to form the waveguide structures (711);

(2) preparation of a germanium film active area of the photoelectric detector array:

depositing a germanium film on the top of the lithium niobate-silicon wafer through a chemical vapor deposition method on a basis of step (1), etching the germanium film through a CMOS process, reserving one piece of germanium film behind the optical input port of each of the $2^n$ silicon-germanium photoelectric detectors as an active area (712), and removing the rest of the germanium film, each piece of the germanium film active area (712) behind the optical input port of each of the $2^n$ silicon-germanium photoelectric detectors covering a section of the waveguide, so that light entering through the optical input port is converted into electric signals when reaching the active area (712);

(3) formation of an electronic circuit:

protecting the electro-optical modulator array (100), the tunable delay line array (200), and the photoelectric detector array (300) formed in steps (1) and (2) with photoresist or a deposited protective material (713), and forming electronic devices (714) required in the system through a standard CMOS process, the electronic devices (714) comprising the clock (401), the frequency multiplier group (402), the frequency divider group (403), the filter group (404), the phase shifter group (405), and an amplifier group (406) in the radio-frequency drive circuit (400), the direct-current drive circuit (500), and the electronic signal processing circuit (600); and (4) preparation of all electrodes (715) and electrical interconnection lines (717):

forming all electrodes of the electro-optical modulator array (100), all electrodes of the tunable delay line array (200), and all electrodes of the photoelectric detector array (300);

forming the electrical interconnection line between all the electrodes of the photoelectric detector array (300) and the electronic signal processing circuit (600), forming the electrical interconnection line between the radio-frequency drive circuit (400) and the electro-optical modulator array (100), forming the electrical interconnection lines of the direct-current drive array (500) with the electro-optical modulator array (100), the tunable delay line array (200), and the photoelectric detector array (300), forming the electrical interconnection line for the sampling gate (101) to receive the analog signal input from the outside out of the monolithically integrated optical analog-to-digital conversion system, and forming the electrical interconnection line for the electronic signal processing circuit (600) to output the digital signals to the outside;

etching to remove the protective layer first and depositing an electrode material in the plane of the waveguide in a case of the photonic device array with the protective layer;

etching to form through-holes (716) first and depositing an electrode material to a position communicated with the electronic devices in a case of the electronic devices with the protective layer; and completing the preparation of all the electric interconnection lines (717).

3. The monolithically integrated optical analog-to-digital conversion system as described in claim 1, wherein a material of a substrate for the lithium niobate-silicon wafer is lithium niobate, silicon, or silicon nitride.

* * * * *